(12) United States Patent
Yanagi et al.

(10) Patent No.: US 6,256,565 B1
(45) Date of Patent: Jul. 3, 2001

(54) VEHICLE SAFETY SYSTEM

(75) Inventors: Eiji Yanagi; Shinji Fukazawa, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/584,349

(22) Filed: Jun. 1, 2000

(30) Foreign Application Priority Data

Jun. 8, 1999 (JP) .................................................. 11-160468
May 11, 2000 (JP) .................................................. 12-138055

(51) Int. Cl.[7] .............................. G06F 17/00; G06F 7/00
(52) U.S. Cl. ................................ 701/45; 701/48; 701/70; 180/232; 180/268; 280/734; 297/468
(58) Field of Search ................................... 701/45, 46, 47, 701/48, 70, 71; 180/65.1, 232, 268; 280/734, 735; 297/468, 483

(56) References Cited

U.S. PATENT DOCUMENTS 4,160,565 * 7/1979 Matsumoto ............................ 297/483
5,251,680 * 10/1993 Minezawa et al. ................... 180/169
5,913,375 * 6/1999 Nishikawa ............................ 180/160

* cited by examiner

*Primary Examiner*—William A. Cuchlinski, Jr.
*Assistant Examiner*—Gertrude Arthur
(74) *Attorney, Agent, or Firm*—Kanesaka & Takeuchi

(57) ABSTRACT

A vehicle safety system includes an obstacle detecting device for detecting an obstacle around a vehicle; a vehicle state detecting device for detecting states of a speed, acceleration, turning sideways, sudden braking, sudden revolving, sideslipping and the like of the vehicle; a dangerous degree determining device for determining a dangerous level of the obstacle with respect to the vehicle or dangerous level of the vehicle itself by receiving information from the obstacle detecting device and/or the vehicle state detecting device; a seat belt device for changing a shape, including an area of a belt, of a touching portion where the belt touches an occupant according to dangerous level information from the dangerous degree determining device; and an occupant identifying device for storing physical characteristics of the occupant sitting on a seat corresponding to the seat belt device. The seat belt device receives information from the occupant identifying device, and changes the shape of the touching portion according to the physical characteristics of the occupant on the seat. Thus, the vehicle safety system provides the occupant with a warning and more suitable protection by estimating a dangerous degree of the obstacle or problem.

14 Claims, 8 Drawing Sheets

VEHICLE SAFETY SYSTEM

BACKGROUND OF THE INVENTION AND RELATED ART STATEMENT

The invention relates to a vehicle safety system for recognizing an obstacle or problem around a vehicle or about the vehicle itself and estimating a dangerous degree of the obstacle and problem to thereby provide an occupant in the vehicle with a warning or protection.

Recently, there has been developed a collision preventing device wherein an obstacle, such as a car, running in front of a vehicle is detected by a radar device or the like; a warning is given to a driver of the vehicle by estimating a collision of the obstacle with the vehicle; or a braking device is operated to lower a speed of the vehicle. As a device for providing the driver with the warning, a warning sound is generated, or a warning light is lighted or lighted on and off. However, the driver may fail to hear the warning sound, or overlook the warning light due to external disorders, such as a driver's driving state, driver's driving ability, a running state, a road surface state or an environment inside the vehicle. Or, even if the driver notices the warning, the driver may not properly respond due to the above stated situations.

In such an emergency situation, the vehicle may cause a sudden spin or slip by a driver's evading action to thereby lead to a rolling or collision. In a conventional protecting device, such as a seat belt device and air bag, only when a collision of the vehicle with the obstacle occurs, the protecting device starts operating to protect the occupant, and does not start operating corresponding to an unstable running state of the vehicle.

Japanese Patent Publication (KOKAI) No. 10-306392 discloses a system wherein in case a collision is foreseen and a possibility of the collision is determined to be high, a belt retreating mechanism of a seat belt device is automatically operated.

The seat belt device is provided with a collision foreseeing sensor, wherein when the collision is foreseen, a tensile strength of a seat belt is made larger to apply a pre-tension thereto. In the device, an acceleration in a rolling direction is detected, and in case rolling of the vehicle or a damage of a driving ability of the vehicle is going to happen, the belt is strongly retracted to remove a slack to thereby fasten an occupant to a seat. As described above, a warning by physical notice allows the occupant to positively perceive a dangerous situation and at the same time protect the occupant.

However, in the seat belt device disclosed in Japanese Patent Publication No. 10-306392, an area and shape of the belt can not be controlled. Also, a protection corresponding to physical characteristics of the occupant can not be provided.

Japanese Patent Publication (KOKAI) No. 7-81520 also proposes a seat belt device, wherein an obstacle around a vehicle is detected; an obstacle degree that the obstacle causes a problem with respect to the vehicle is determined; and a seat belt is controlled according to the result thereof. More specifically, as the obstacle degree is higher, the tensile strength of the belt is made stronger to thereby allow the occupant to bodily sense the warning and to protect the occupant beforehand.

However, the seat belt device disclosed in Japanese Patent Publication No. 7-81520 does not control the area and shape of the belt, neither. Also, the protection corresponding to the physical characteristics of the occupant can not be provided.

As a device where a binding or holding ability of a seat belt device is more securely made, there is proposed an inflatable seat belt device in Japanese Patent Publication (KOKAI) No. 5-112201. In the seat belt, a portion of the seat belt where an occupant shoulder touches is provided with a bag-shape portion. The bag-shape portion is expanded through injection of gas from a gas generating device at a time of an emergency to thereby receive a moving energy of the occupant with the wider area of the belt.

However, in Japanese Patent Publication No. 5-112201, foreseeing of the collision and protection corresponding to the physical characteristics of the occupant are not considered.

The above seat belt devices contribute to improvement in safety of the occupant. However, a safety system for providing the occupant with more appropriate protection is required.

In view of the above, the present invention has been made and an object of the invention is to provide a vehicle safety system for recognizing an obstacle and problem around a vehicle or about the vehicle itself and estimating a dangerous degree of the obstacle and problem to thereby provide an occupant in the vehicle with a warning or more suitable protection.

Further objects and advantages of the invention will be apparent from the following description of the invention.

SUMMARY OF THE INVENTION

In order to attain the above objects, a vehicle safety system according to a first aspect of the present invention includes an obstacle detecting device for detecting an obstacle around a vehicle; a vehicle state detecting device for detecting states, such as a speed, acceleration, rolling, sudden braking, sudden turning and side-slipping of the vehicle; a dangerous degree determining device for determining a dangerous level of the obstacle with respect to the vehicle and/or a dangerous level of the vehicle itself by receiving information from the obstacle detecting device and/or the vehicle state detecting device; and a seat belt device disposed in the vehicle and having a belt controlling device for changing an area and/or shape of a touching portion where the belt touches an occupant according to the dangerous level information from the dangerous degree determining device.

Since the shape including the area of the touching portion where the belt touches the occupant is controlled according to the determined dangerous degree, a more appropriate protection can be provided to the occupant.

The above vehicle safety system further includes an occupant identifying device wherein the physical characteristics of the occupant sitting on a seat corresponding to the seat belt device are detected or stored. Thus, the area and/or shape of the touching portion where the belt touches the occupant can be changed by receiving the information from the occupant identifying device, and according to the physical characteristics of the occupant sitting on the seat.

Since the appropriate protection according to the physical characteristics of the occupant can be provided, the force and pressure transmitted to the occupant and the binding or holding state of the occupant by the belt can be more improved.

More specifically, based on the special information of each occupant, such as a physical structure determined from a height and a weight of the occupant; strength of a skeletal structure determined from an age, sex and the like; and physical characteristics or patient's conditions requiring a special care at the time of a seat belt operation, a strong expansion of the seat belt is given to an occupant who is tolerable against a strong expansion force, and a weak expansion of the seat belt is given to an occupant who is not tolerable against the strong expansion force. Thus, more appropriate protection can be provided to the occupant without giving a burden to a body of the occupant.

A vehicle safety system according to a second aspect of the present invention includes an obstacle detecting device for detecting an obstacle around a vehicle; a vehicle state detecting device for detecting states, such as a speed, acceleration, rolling, sudden braking, sudden turning and side-slipping of the vehicle; a dangerous degree determining device for determining a dangerous level of the obstacle with respect to the vehicle and/or a dangerous level of the vehicle itself by receiving information from the obstacle detecting device and/or the vehicle state detecting device; a seat belt device disposed in the vehicle and having a belt controlling device for changing a tensile strength of the belt according to a dangerous level information from the dangerous degree determining device; and an occupant identifying device for detecting or storing physical characteristics of the occupant sitting on a seat corresponding to the seat belt device. The belt controlling device changes the shape including an area of the touching portion of the belt touching the occupant by receiving the information from the occupant identifying device and according to the physical characteristics of the occupant sitting on the seat.

According to the determined dangerous degree, an appropriate protection can be provided to the occupant. Also, according to the physical characteristics of the occupant, a strong tensile strength is given to an occupant who is tolerable to the strong seat belt tensile strength and a weak tensile strength is given to an occupant who is not tolerable against the strong seat belt tensile strength. Thus, a perfect protection can be provided to the occupant.

In the vehicle safety system of the present invention, the vehicle state detecting device has a sensor for detecting at least one of accelerations in front-rear directions, left-right directions and upper-lower directions of the vehicle, and angular speeds around axes of the respective directions. It is preferable that the dangerous degree determining device determines (1) a normal running state, such as start, acceleration, turning and braking of the vehicle; (2) an unstable state, such as sudden braking, sudden turning and side-slipping of the vehicle; (3) a dangerous state which may cause a collision, rolling, spin or the like of the vehicle; and 4) an accident state where a collision or rolling of the vehicle occurs.

The tensile strength of the seat belt and/or the shape including the area of the portion where the belt touches the occupant can be precisely controlled according to the emergency situation, by detecting a direction and amount of a load that the vehicle receives and classifying its dangerous level.

Further, it is preferable to have a storing portion for tracking and recording a start and completion of the accident or problem determined by the dangerous degree determining device, so that the record can be used for examining the accident afterward.

In the vehicle safety system of the invention, the belt controlling device of the seat belt device includes the seat belt having a bag-shape portion disposed in at least a part of the belt which touches the occupant and normally held in a belt-shape; and a belt expansion-contraction device for introducing a gas into the bag-shape portion to expand thereof and discharging the gas from the bag-shape portion to restore to the belt-shape.

At this time, there is provided a gas pressure controlling device for controlling a pressure of the introduced gas.

Further, an inner portion of the bag-shape portion of the seat belt device is partitioned into at least two divisions. The expansion-contraction device includes a device for expanding or contracting the respective divisions individually or in cooperation together; and a device for controlling a gas flow speed and a gas pressure when a gas is introduced into or discharged from the respective divisions.

Further, the gas pressure controlling device includes a gas storing portion, wherein an inner pressure is normally held higher than a predetermined value, and when the pressure value becomes lower than the predetermined value, a gas is introduced from an exterior to increase the pressure therein and is stopped when the gas pressure becomes higher than the predetermined value.

In case the bag-shape portion of the belt is expanded at a time of emergency, since the tensile strength and pressure of the belt and the shape including the area of the portion where the belt touches the occupant are changed, the strength and pressure to be applied to the occupant and a state for binding or holding the occupant can be set more desirably. Further, the seat belt device notifies the occupant of an accident or emergency situation through a sense of touch, sense of sight and sense of hearing of the occupant. Therefore, a driver can positively infer the emergency situation from them to thereby take a measure for avoiding the emergency situation. Also, the occupant can be protected from a braking movement of the vehicle accompanying the avoiding operation.

In the present invention, the occupant identifying device includes an individual identifying device for identifying occupants sitting on respective seats; a data base for storing information about physical characteristics of the individuals registered beforehand; and a reading device for reading out, from the data base, the information about physical characteristics of the occupant identified by the individual identifying device.

The seat belt device provided in each seat in the vehicle can be suitably controlled by identifying the occupant sitting on the seat and holding the physical characteristics of the occupant.

DETAILED DESCRIPTION OF PREFERRED EMBODIMENT

Hereunder, the present invention will be described with reference to the accompanying drawings.

Figure 1:
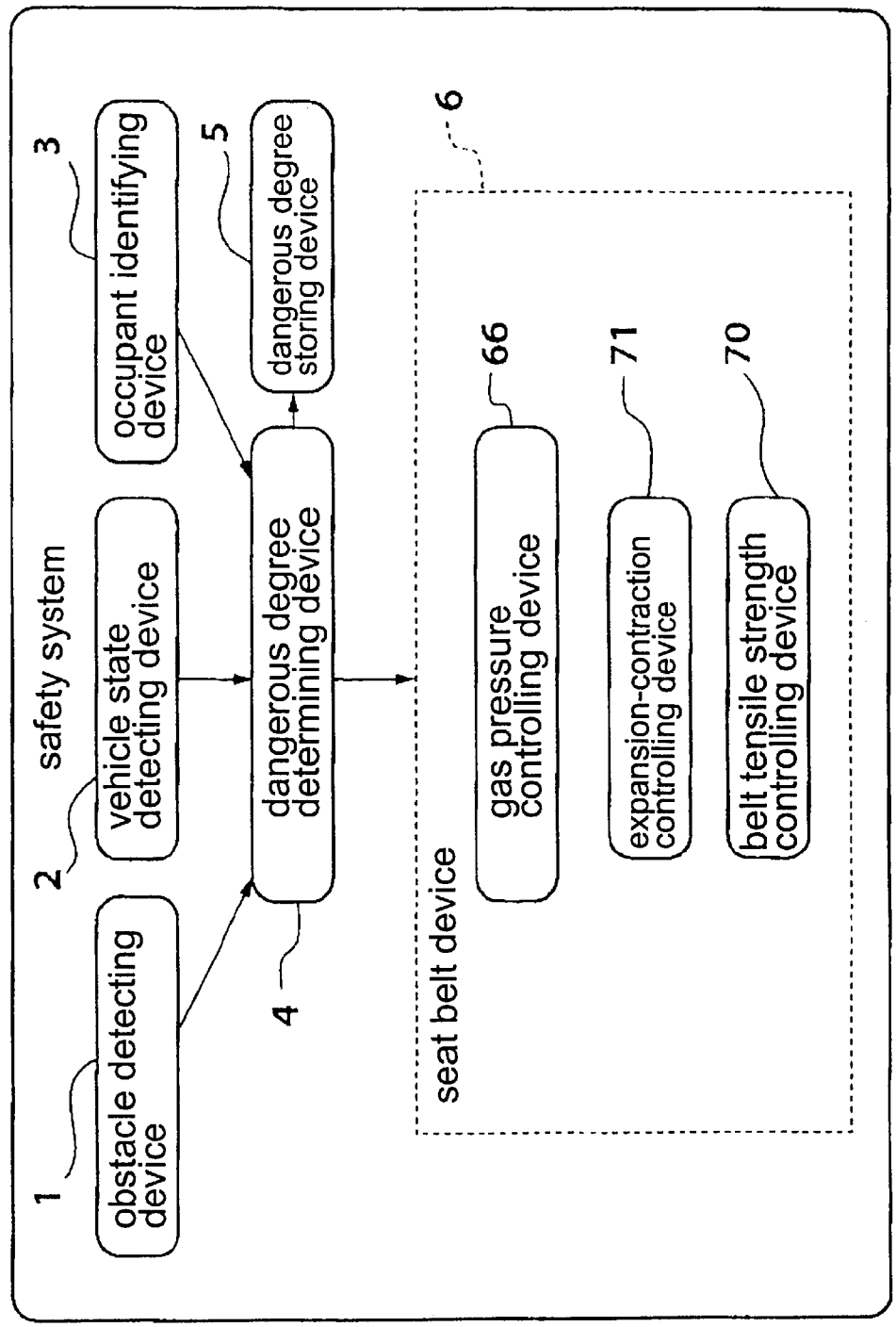
FIG. 1 is a diagram showing a structure of a vehicle safety system of an embodiment according to the present invention.

FIG. 1 is a drawing showing a structure of a vehicle safety system of an embodiment according to the present invention.

A vehicle safety system 10 includes an obstacle detecting device 1, a vehicle state detecting device 2, an occupant identifying device 3, a dangerous degree determining device 4, a dangerous degree storing or registering device 5, and a seat belt device 6.

Data from the obstacle detecting device 1, the vehicle state detecting device 2 and the occupant identifying device 3 is inputted into the dangerous degree determining device 4 formed of a CPU. The dangerous degree determining device 4 determines a dangerous degree based on the inputted obstacle information and vehicle state, and controls the seat belt device 6 to provide a warning or a protection suitable for physical structures and characteristics of an occupant identified by the occupant identifying device 3 according to a determined dangerous degree. Incidentally, in case the dangerous degree is determined, it may be determined based on only information from either the obstacle detecting device 1 or the vehicle state detecting device 2.

The respective devices constituting the vehicle safety system according to the invention will be described in detail.

The obstacle detecting device 1 detects an obstacle in front of a vehicle and measures a relative distance between the vehicle and the obstacle. As the obstacle detecting device 1, a radar device, a stereo camera device or the like may be used. A relative speed for a time is calculated from the measured relative distance. In case the relative speed is decreased, the vehicle is separated from the obstacle to indicate a condition leaving from the obstacle. On the other hand, in case the relative speed is increased, the vehicle approaches the obstacle to indicate a condition increasing the dangerous degree. The relative distance and the relative speed are inputted to the dangerous degree determining device 4 to determine possibility of a collision.

Figure 2:
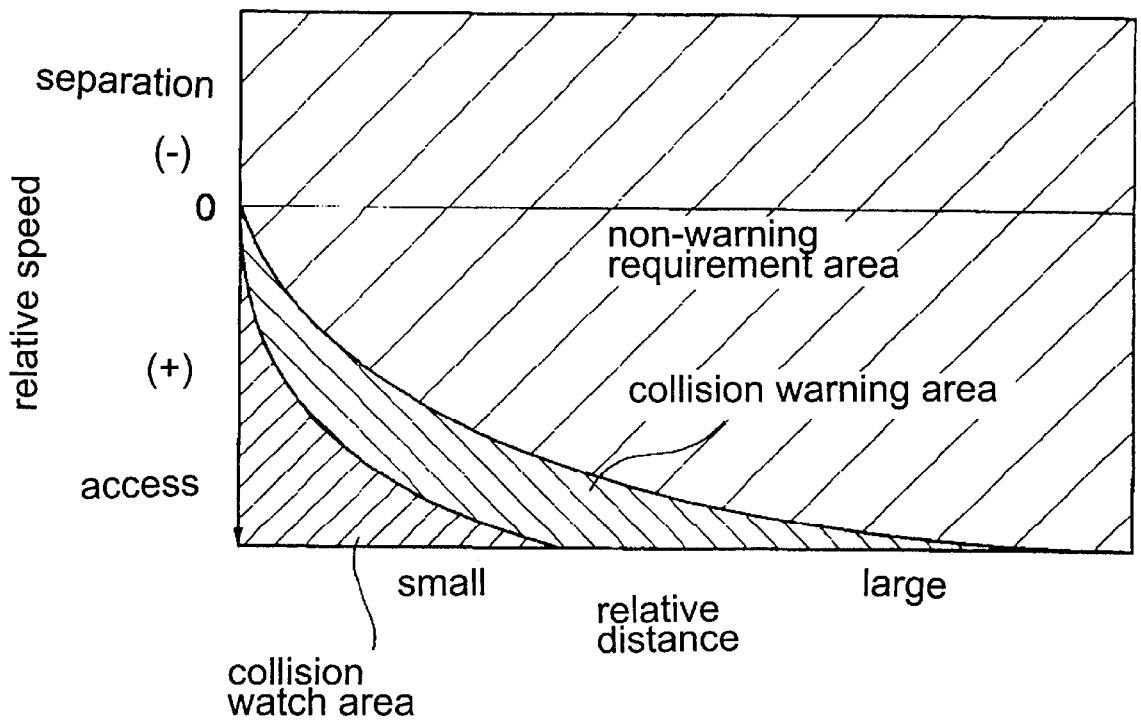
FIG. 2 is a diagram showing a relationship between values detected by an obstacle detecting device and a warning sign generation.

FIG. 2 is a diagram showing relationships between the values detected by the obstacle detecting device and collision possibilities, wherein the ordinate represents the relative speed and the abscissa represents the relative distance.

In case the relative speed is decreased, the area does not require a warning (hereinafter referred to as non-warning requirement area), practically regardless of the relative distance. More specifically, in case the obstacle and the vehicle are separated from each other, it is not required to take an emergency measure, such as sudden braking or sudden turning. However, in case the relative speed is positive (+) and the relative distance is extremely short, the vehicle is going to collide with the obstacle, which becomes a collision watch area. In other words, in case the vehicle and the obstacle approach each other very quickly, and further come extremely close to each other, there is a high collision possibility. Also, an area positioned between the non-warning requirement area and the collision watch area becomes a collision warning area since the collision can be prevented by providing the warning.

Figure 3:
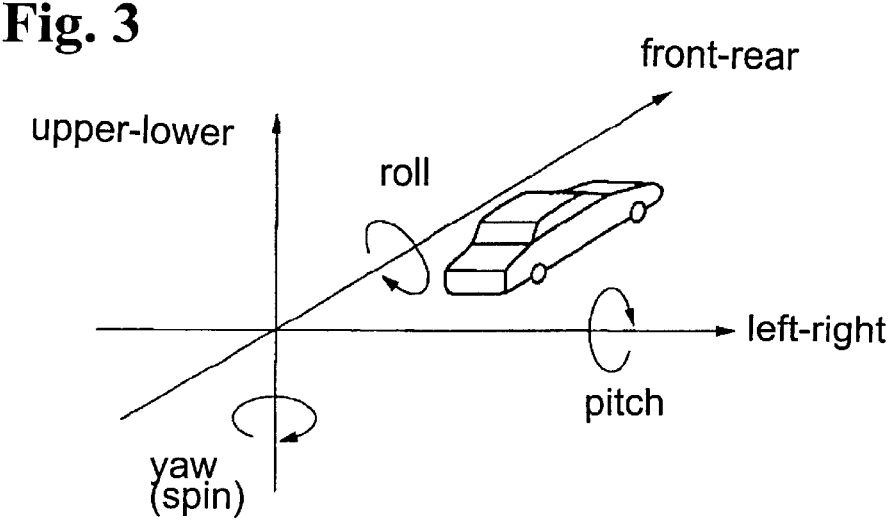
FIG. 3 is a diagram showing movements of a vehicle detected by a vehicle state detecting device.

FIG. 3 is a diagram showing movements of the vehicle detected by the vehicle state detecting device.

The vehicle state detecting device 2 is a sensor for detecting accelerations in the front-rear directions, left-right directions or upper-lower directions of the vehicle, and angular speeds around axes of the respective directions. The rotation along an axis of the front-rear directions is called "roll"; the rotation along an axis of the left-right directions is called "pitch"; and the rotation along an axis of the upper-lower directions is called "yaw" (spin). Time sequence changes of the detected respective data are obtained, and compared with the data in the normal state thereof. Although the respective values at the normal state are smoothly varied, sudden acceleration changes take place at a time of emergency. For example, in case a sudden braking is carried out, the acceleration in the front direction is suddenly reduced. When the vehicle is rolling, the acceleration in a direction opposite to the rolling direction is detected by the roll sensor. Also, in case the vehicle is spinning at a curve, the angular speed of a yaw sensor becomes higher than a predetermined value, and the accelerations in the front-rear directions and in the left-right directions are synchronously increased or decreased. A rolling of the vehicle is detected by the angular speed and time of the roll sensor. The detected values are inputted to the dangerous degree determining device 4.

The occupant identifying device 3 identifies occupants who sit on the respective seats in the vehicle to thereby take out information, such as physical structures and characteristics of the respective occupants. As the occupant identifying device, a fingerprint sensor provided at a buckle of a seat belt, ID card and the like can be used. The physical characteristics, such as height, weight, age and sex, of the occupants are stored in a data base beforehand. Thus, when an occupant or driver gets into the vehicle, the occupant is identified by reading a fingerprint of the occupant by the fingerprint sensor or inserting his ID card to thereby take out information corresponding to the occupant from the data base. The taken-out data is inputted to the dangerous degree determining device 4.

Figure 4:
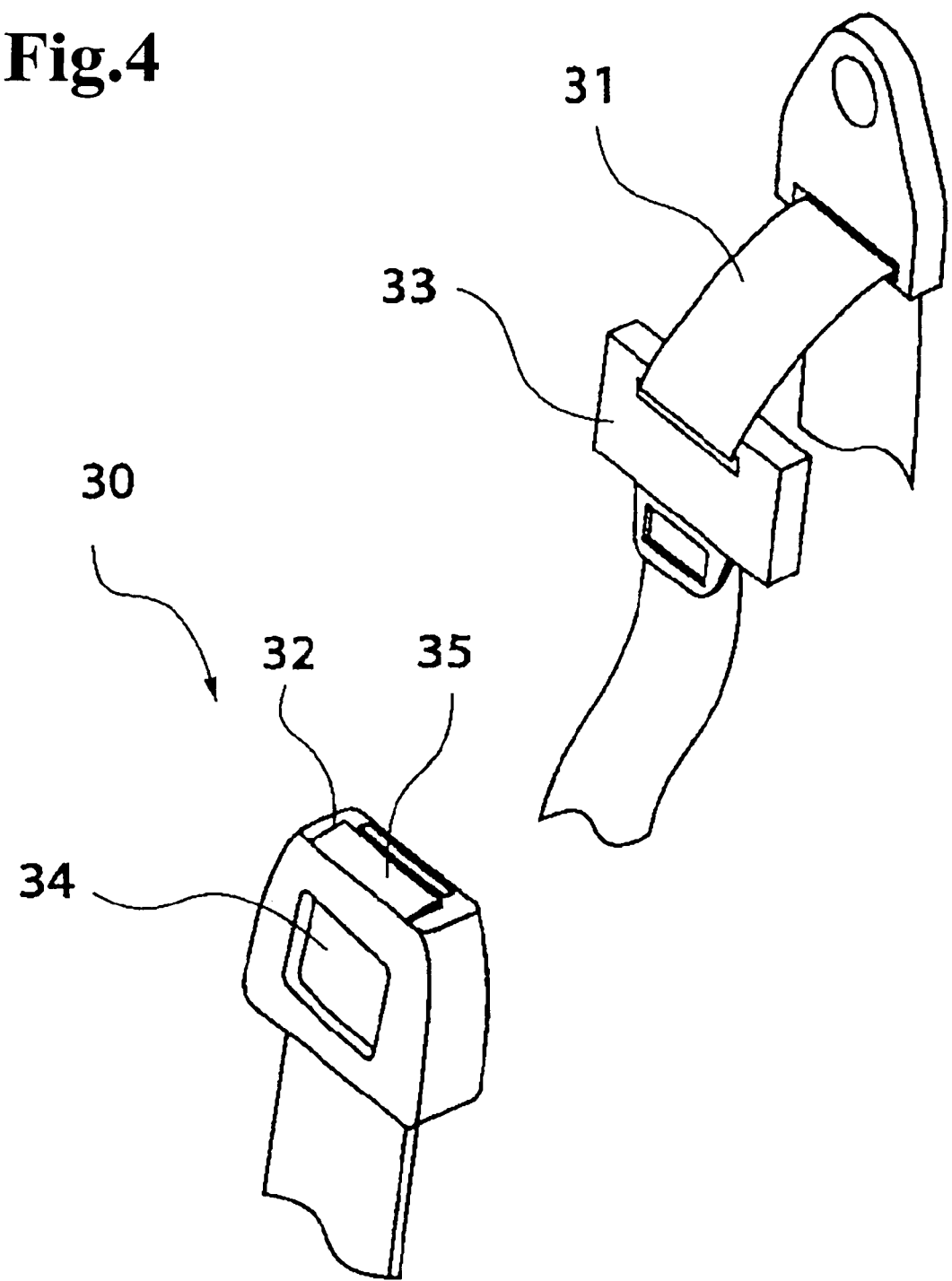
FIG. 4 is a diagram showing a state where a fingerprint sensor is attached to a buckle of a seat belt.

FIG. 4 is a diagram showing a state where the fingerprint sensor is attached to the buckle of the seat belt.

The fingerprint sensor 30 is integrally provided at a buckle 32 of a seat belt 31. The buckle 32 is supported by a left hand of the occupant when the seat belt 31 is put on, into which a tongue 33 of the seat belt held by a right hand is inserted. A side surface of the buckle 32 is provided with a groove 34 easily hold the buckle 32. A shallow depressed portion 35 is formed on an upper surface of the buckle 32, on which a thumb can be placed. A detecting surface of the fingerprint sensor is positioned on the depressed portion 35. When four fingers except the thumb are inserted into the groove 34, the thumb is naturally placed on the depressed portion 35 to thereby detect the fingerprint of the thumb.

Figure 5:
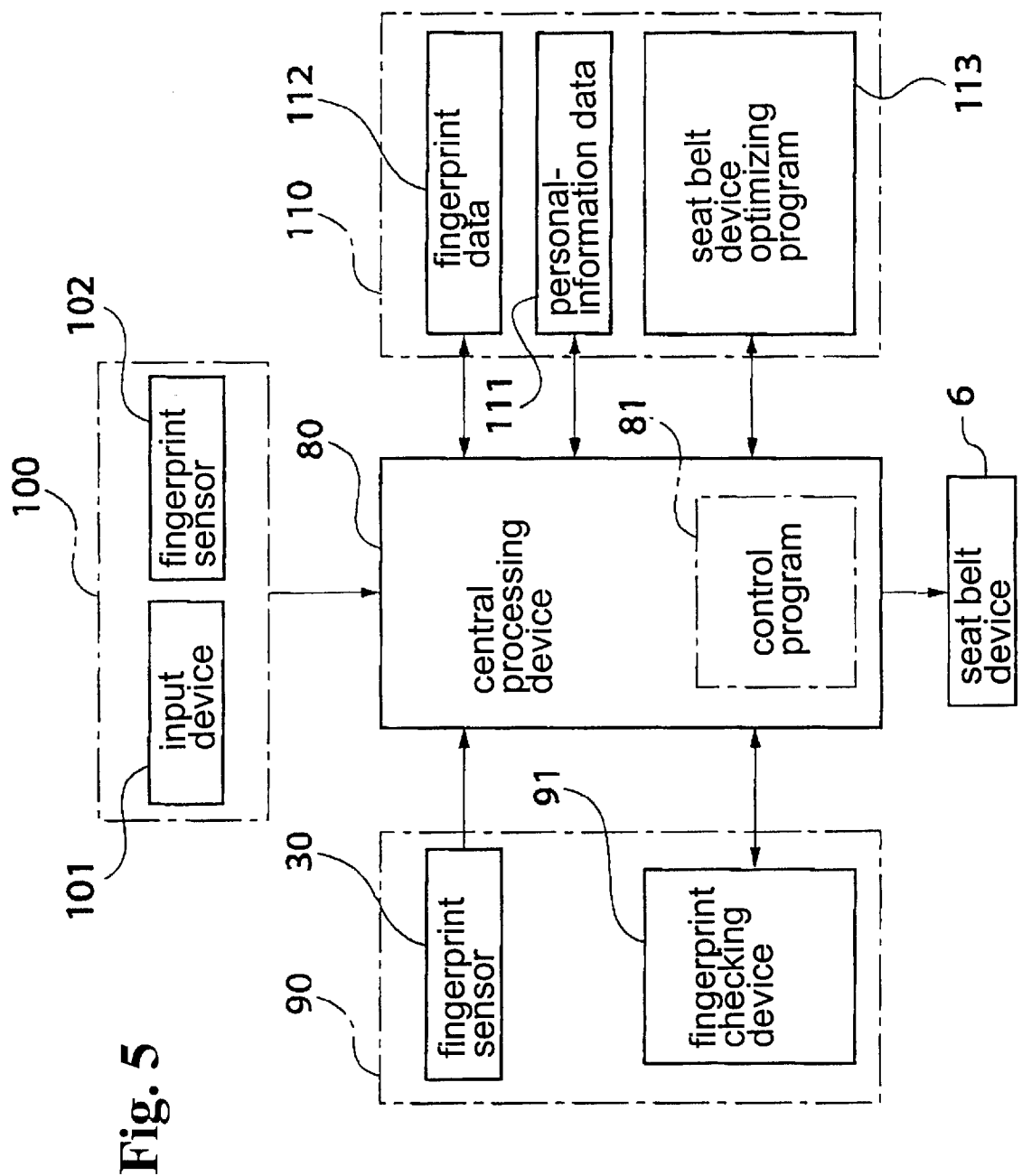
FIG. 5 is a block diagram of a computer constituting an occupant identifying device equipped with the fingerprint sensor as shown in FIG. 4.

FIG. 5 is a block diagram of a computer constituting the occupant identifying device equipped with the fingerprint sensor as shown in FIG. 4.

The computer includes a central processing portion 80, a fingerprint input portion 90, an information input portion 100 and a storing portion 110.

The information input portion 100 has an input device 101, such as a key board, with which physical characteristics, such as weights, heights and ages, of every occupant permitted by a car owner or his family are inputted. The inputted information is stored in a personal information data storing portion 111 of the storing portion 110. The fingerprint data of the occupants is registered in a fingerprint data storing portion 112 through a separate fingerprint sensor 102.

A seat belt device optimizing program 113 is stored in the storing portion 110. The program controls a tensile strength of the seat belt device and an expansion degree of the bag-shape portion according to the occupant's physical characteristics stored in the personal information data storing portion 111.

The fingerprint input portion 90 includes the fingerprint sensor 30 and a fingerprint checking device 91. The fingerprint read by the fingerprint sensor 30 is compared with the fingerprint data stored in the fingerprint data storing portion 112 by the fingerprint checking device 91 to determine whether the occupant is a registered person or not.

Therefore, when the fingerprint of the occupant is read by the fingerprint sensor 30 of the fingerprint input portion 90, the fingerprint is compared with the fingerprint data stored in the fingerprint data storing portion 112 by the fingerprint checking device 91. When the occupant is identified, the physical characteristics of the occupant are taken out from the personal information data storing portion 111. Then, the seat belt device 6 is suitably operated according to the physical characteristics by the seat belt device optimizing program 113. The process is controlled according to a controlling program 81 of the central processing device 80.

Figure 6:
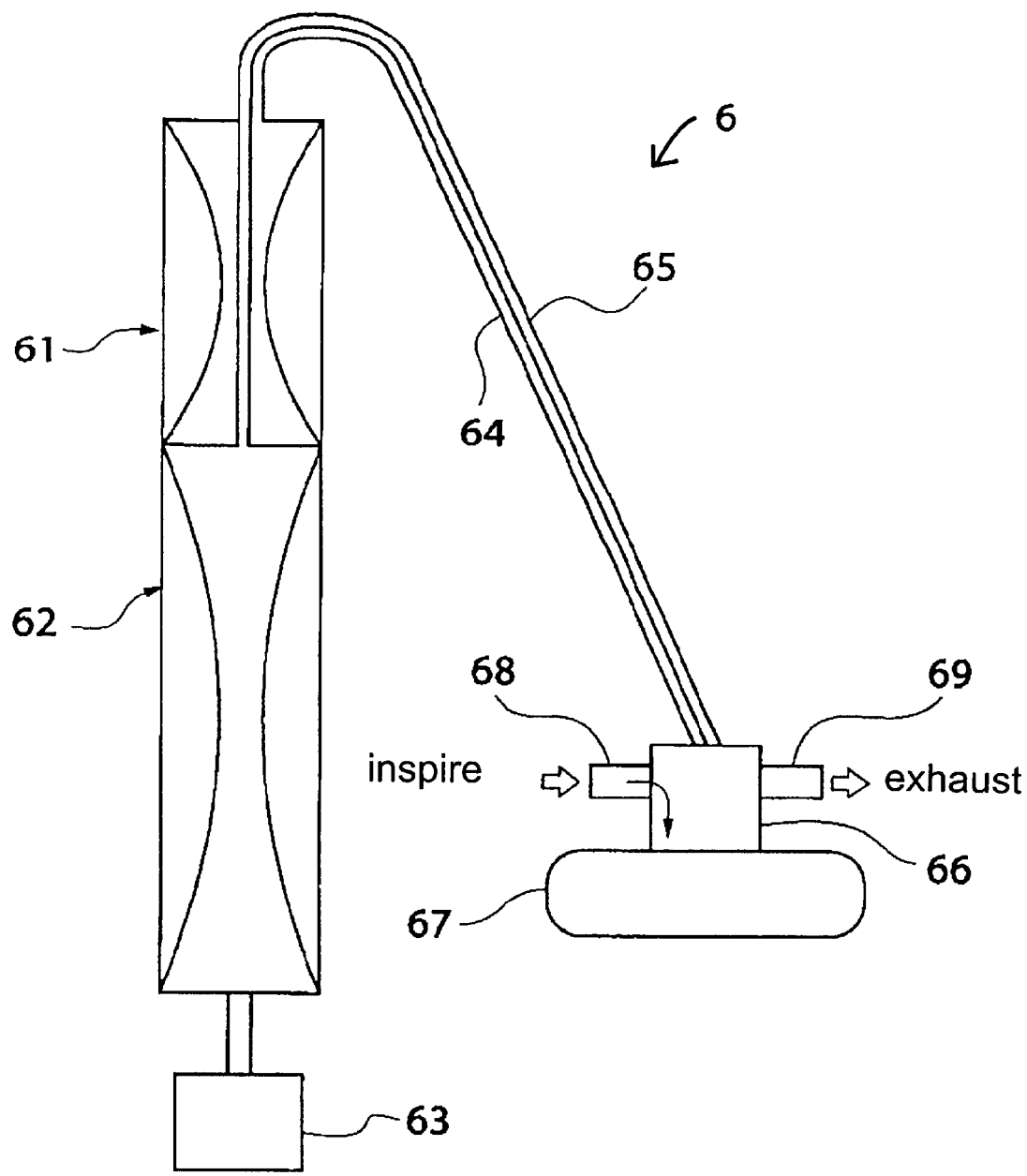
FIG. 6 is a diagram showing a structure of a seat belt device according to the present embodiment.

FIG. 6 is a diagram showing a structure of the seat belt device of the embodiment.

The seat belt device 6 is an inflatable seat belt, in which bag-shape portions 61 and 62 are provided to portions where a shoulder belt touches a temple portion (side of a head) and a chest portion of the occupant. A buckle 63 is provided to a lower end portion of the shoulder belt. The buckle is fixed to a seat. On the other hand, an upper end portion of the shoulder belt extending upwards beyond the chest portion and the temple portion of the occupant is deflected downwards by a deflector (not shown), and then fixed to a vehicle body.

Pipes 64, 65 for supplying expansion gases are connected to the temple side bag-shape portion 61 and the chest side bag-shape portion 62, respectively, so that the bag-shape portions are expanded separately. The other ends of the pipes 64, 65 are connected to a tank 67 of an expansion gas, i.e. air, through a gas pressure controlling device 66. Incidentally, compressed air is supplied to the tank 67 from a compressor or the like loaded on the vehicle.

Figure 7A:
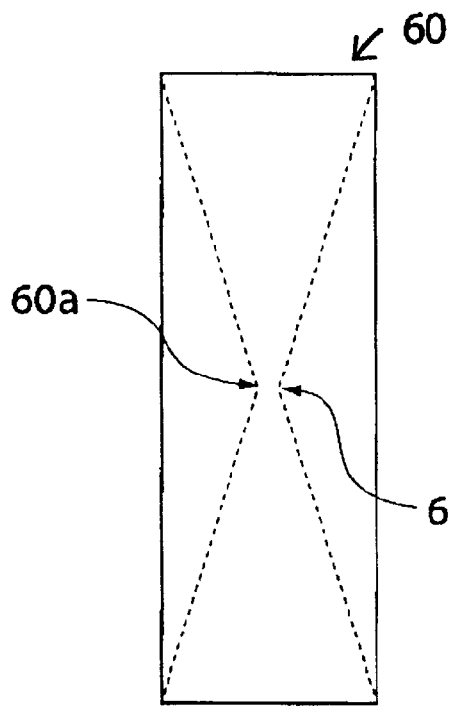
FIG. 7(A) is a front view showing a structure of a bag-shape portion of a shoulder belt, wherein the bag-shape portion is folded.
Figure 7B:
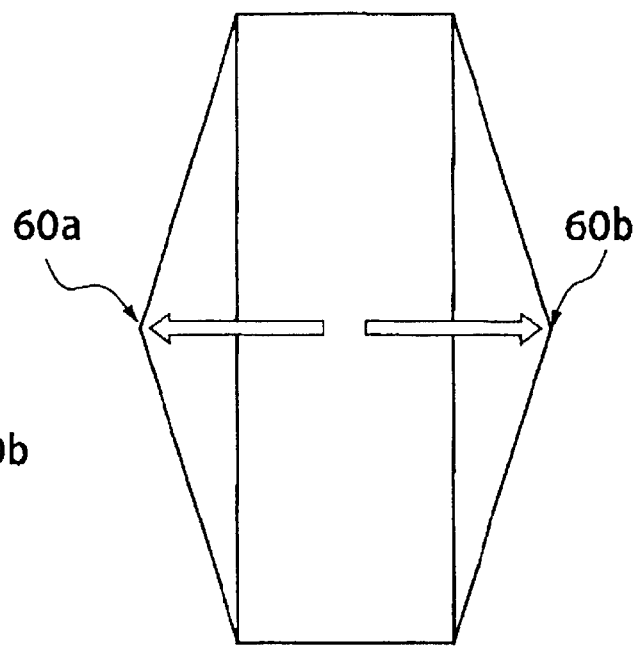
FIG. 7(B) is a front view of the bag-shape portion of the shoulder belt in an expanded state.
Figure 7C:
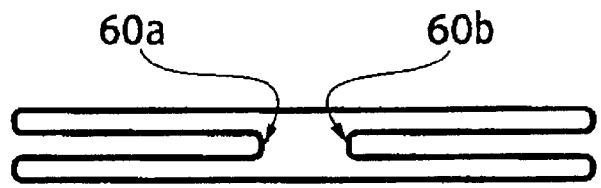
FIG. 7(C) is a sectional view of the bag-shape portion in a folded state.
Figure 7D:
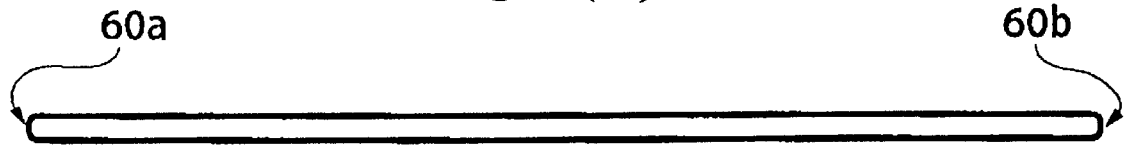
FIG. 7(D) is a sectional view of the bag-shape portion in the expanded state.

FIG. 7(A) is a front view of a folded bag-shape portion of the shoulder belt; FIG. 7(B) is a front view of an exploded bag-shape portion; FIG. 7(C) is a sectional view of the folded bag-shape portion; and FIG. 7(D) is a sectional view of the exploded bag shape portion.

The bag-shape portion 60 is formed by closing outer circumferences of two cloth members of a hexagonal shape as shown in FIG. 7(B). These cloth members have non-elasticity and an air sealing ability. Two opposing corners 60a, 60b of the hexagon of the cloth members are folded between two cloths as shown in FIG. 7(C). In a normal folded state, the bag-shape portion has a belt shape as shown in FIG. 7(A). When the expansion gas, i.e. air, is supplied to the bag-shape portion, the folded corner portions 60a, 60b open outward to expand the whole bag-shape portion as shown in FIG. 7(B).

The expanded temple side bag-shape portion forms a space between the temple portion, i.e. side of a head, of the occupant and the car body to thereby reduce problems caused by hitting the temple portion against the car body when the vehicle is subjected to a side surface collision, rolling, sudden lateral movements or the like. Also, the expanded chest side bag-shape portion protects a chest portion of the occupant and at the same time reduces problems of the occupant caused by throwing out forward.

Further, the respective bag-shape portions are provided with two step expanding functions, i.e. a first warning expansion step for letting the occupant know an emergency situation and a second full expansion step for protecting the occupant from the collision. More specifically, in the first warning expansion step, the chest side bag-shape portion is expanded on the order of a pressure which the occupant can sense to thereby warn the occupant about the emergency situation. In the full expansion step, i.e. the second step, both chest side bag-shape portion and the temple side bag-shape portion are fully expanded to thereby protect the chest portion and the temple portion of the occupant. The control of the expansions of the bag-shape portions is carried out by the gas pressure controlling device 66, such as a variable decompression valve or a three-way valve.

Figure 8:
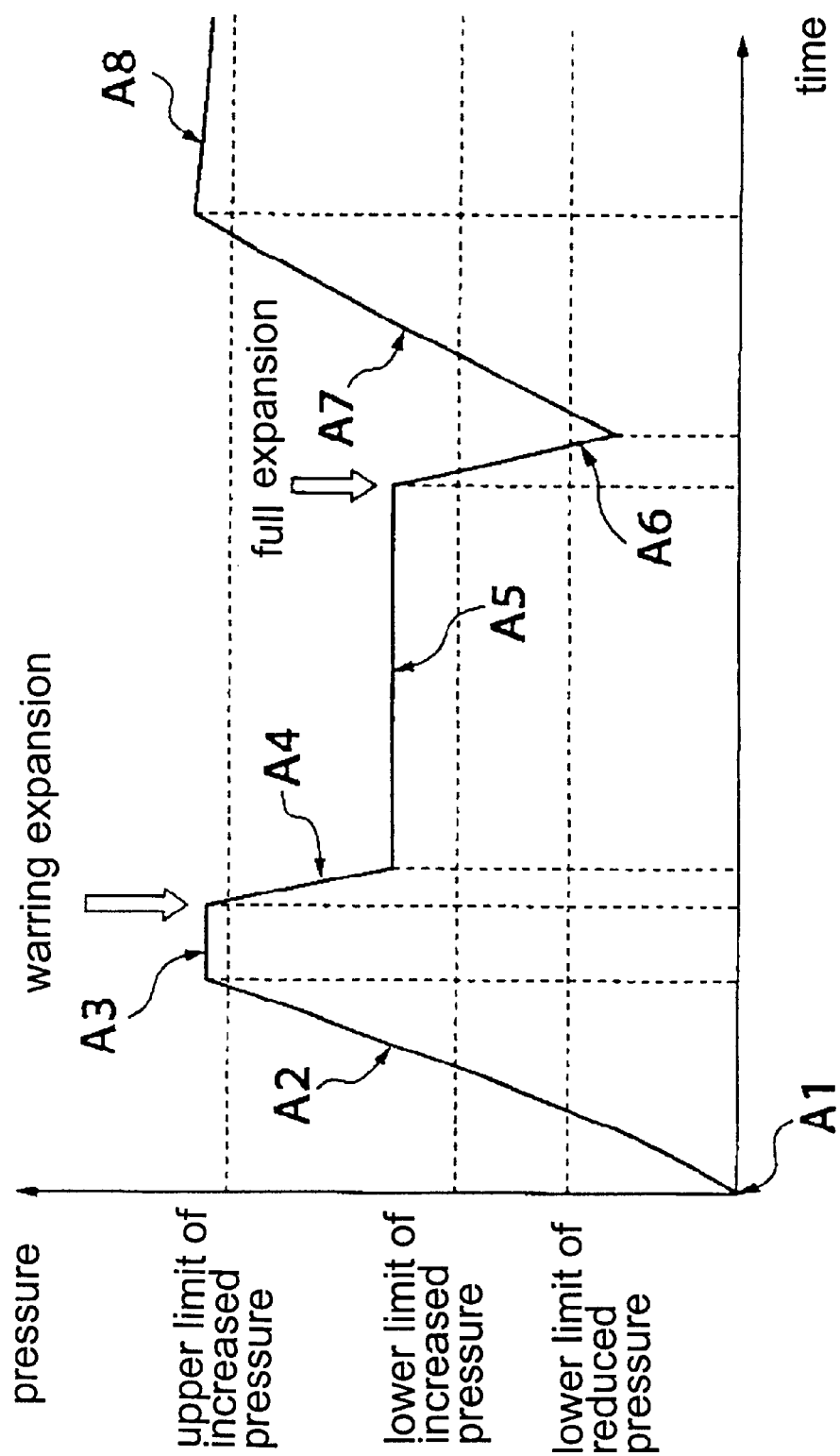
FIG. 8 is a diagram showing changes of inner pressures in a gas tank, wherein the ordinate denotes the inner pressure of the gas tank, and the abscissa denotes time.

FIG. 8 is a diagram showing changes of an inner pressure in the gas tank, wherein the ordinate represents the inner pressure of the gas tank, and the abscissa represents time.

The inner pressure of the tank is maintained at the same pressure as the atmospheric pressure at an initial state when the vehicle is shipped from a factory or parts are replaced (A1). When the vehicle starts moving, the gas pressure controlling device 66 takes air into the gas tank 67 from an intake port 68 through a compressor or the like (A2) to thereby keep the pressure in the gas tank at an upper limit of increased pressure (A3, i.e. 3 kgf/cm$^2$). In case the warning expansion is carried out, a gas is supplied to the bag-shape portion until the pressure in the gas tank becomes slightly higher than a lower limit, i.e. 2 kgf/cm$^2$, of increased pressure (A4). At this time, the bag-shape portion is expanded to the first step and the pressure in the gas tank is held in this value (A5). Next, in case the full expansion is carried out, the gas is supplied to the bag-shape portions until the pressure in the tank becomes slightly lower than a lower limit of reduced pressure (A6, i.e. 1 kgf/cm$^2$). At this time, the bag-shape portions are expanded to the second step where the gas supplied at A6 is added to the gas supplied at A4. Thereafter, air is again taken in through the intake port (A7) to thereby hold the pressure in the gas tank at a predetermined value (A8).

After the warning expansion, when the warning is suspended or cancelled, the gas in the bag-shape portion is discharged from an exhausting port 69 through the gas pressure controlling device. Also, since the bag-shape portion has a function for memorizing the belt-shape (FIGS. 7(A) and 7(C)), in case the air therein is discharged to reduce the pressure, the bag-shape portion returns to the original shape. Incidentally, it is sufficient that the pressure at the time of the full expansion in the belt-like bag-shape portion is in a range of 0.4 to 0.6 kgf/cm$^2$.

The bag-shape portion of the seat belt may be made of an expandable material having an airtight ability, such as rubber. In this case, it is not necessary to form the bag-shape portion in a folded state. The bag-shape portion is expanded from an ordinary state, and returned to the ordinary state when air is discharged therefrom.

Next, a process of the dangerous degree determining device is explained.

Figure 9:
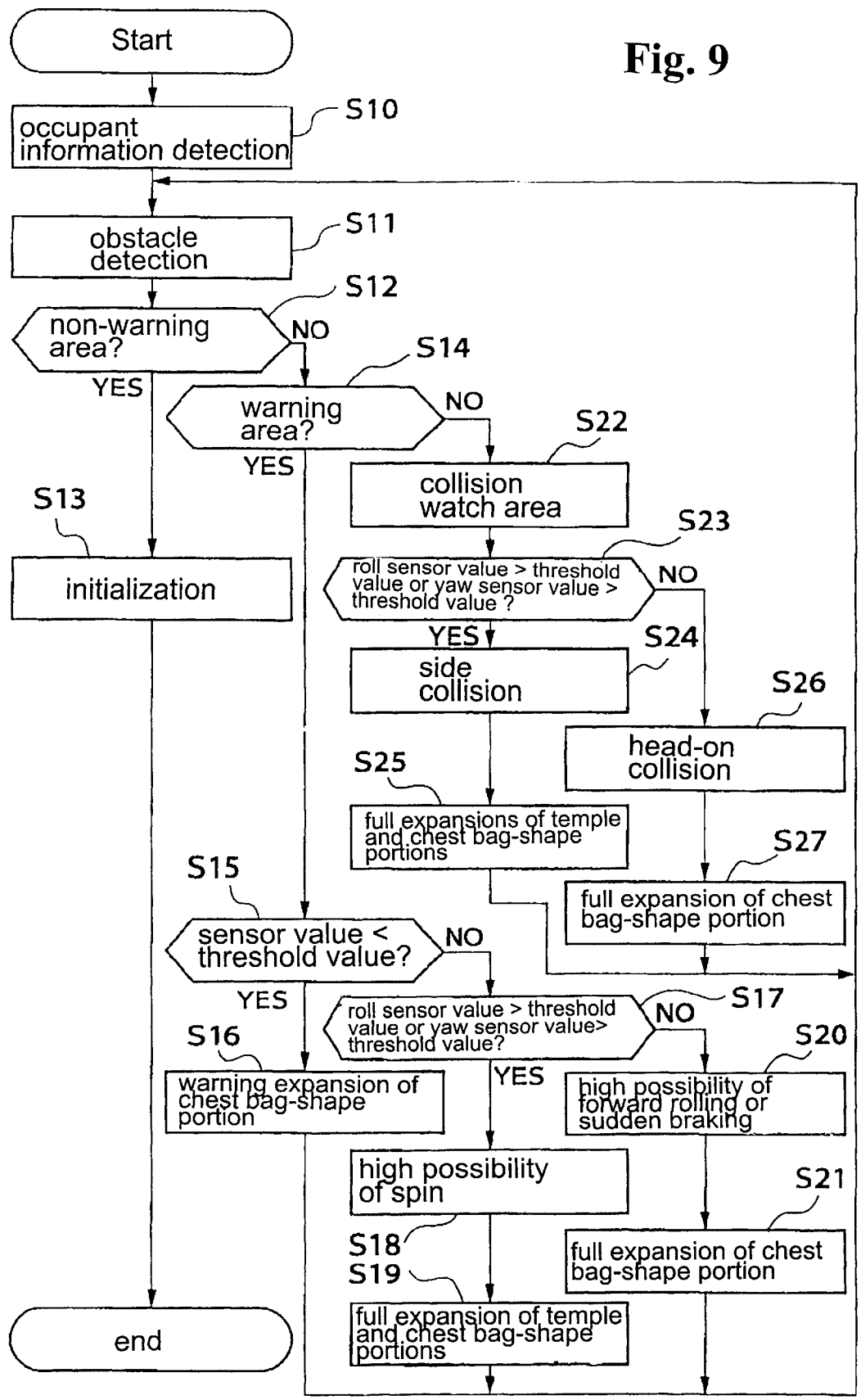
FIG. 9 is a flow chart showing a process of a dangerous degree determining device.

FIG. 9 is a flow chart showing a process of a dangerous degree determining device.

First, at S10, an occupant getting in the vehicle is identified by the occupant identifying device to take out a personal information, such as the physical characteristics of the occupant. Then, at S11, an obstacle in front of the vehicle is detected by the obstacle detecting device to calculate a relative speed and a relative distance between the vehicle and the obstacle. At S12, a non-warning requirement area or not is determined from the relative speed and the relative distance based on a correlation drawing as shown in FIG. 2. In case it is determined that the vehicle is in the non-warning requirement area, the vehicle is supposed to be in a normal running state to thereby advance to S13 to initialize everything and then come to an end.

In case it is determined at S12 that the vehicle is not in the non-warning requirement area, the process advances to S14, wherein a collision warning area or not is determined. In case the vehicle is determined to be in the collision warning area, the process advances to S15 to read values outputted from the respective sensors of the vehicle state detecting device. In case the values of all the sensors are less than their threshold values, the vehicle is supposed to be in a slightly unstable running state, and the process goes to S16 wherein the chest side bag-shape portion of the seat belt is subjected to the warning expansion to thereby call attention of an occupant.

In case any one of the sensor values is higher than its threshold value at S15, the process advances to S17 to compare the roll sensor value and yaw sensor value with threshold values thereof. In case any one of the values is higher than its threshold, the process goes to S18 where it is determined that there is a high possibility of rolling sideways or spin of the vehicle, and then advances to S19 where the chest side and temple side bag-shape portions of the seat belt are expanded to thereby call the occupant's attention, and at the same time, safely fasten the occupant to the seat.

At S17, in case both roll sensor value and yaw sensor value are less than their threshold values, the pitch sensor value is supposed to be higher than its threshold value. At S20, it is determined also to be in a dangerous situation such that there is a possibility of a forward revolution or sudden braking. At S21, the chest side bag-shape portion of the seat belt is expanded to thereby call the occupant's attention, and at the same time, reduces problems caused by throwing out of the occupant forward.

At S14, in case it is determined that the vehicle is not in the collision warning area, the process advances to S22, that is the collision watch area. At S23, the roll sensor value and the yaw sensor value are compared with their threshold values. In case any one of the sensor values is higher than its threshold value, the vehicle senses a sudden acceleration in the left-right directions to thereby determine at S24 that there is a high possibility of a side collision or rolling sideways. At this time, at S25, the chest side bag-shape portion and temple side bag-shape portion of the seat belt are expanded to reduce problems caused by throwing out of the occupant forward or abutting of the occupant temple against a vehicle body.

At S23, in case the roll sensor value or yaw sensor value is less than its threshold value, it is determined at S26 that there is a high possibility of a head-on collision. At this time, at S27, the chest side bag-shape portion of the seat belt is expanded to reduce problems caused by throwing of the occupant forwards.

Incidentally, the expansions of the bag-shape portions are controlled by an expansion-contraction controlling device 71 according to the occupants physical characteristics read at S10. Further, the seat belt device 6 includes a belt tensile strength controlling device 70 to thereby control the tensile strength of the belt according to the physical characteristics of the occupant.

At the full expansion, generally, as the occupant has a larger physical condition or characteristic, the expanding degrees of the chest side bag-shape portion and the temple side bag-shape portion of the seat belt device become higher, so that the tensile strength of the belt is set at a higher value. The warning expansions of both bag-shape portions are set at values lower than those of the full expansions.

The dangerous degree storing device 5 stores the relative speed and relative distance calculated at the obstacle detecting device 1, and values detected by the roll sensor, yaw sensor and pitch sensor of the vehicle state detecting device 2. The information can be used for examining the accidents or the like.

As apparent from the above explanation, the present invention provides a vehicle safety system for recognizing an obstacle and problems around the vehicle or about vehicle itself and estimating the dangerous degrees to thereby provide an occupant with a warning and protection.

While the invention has been explained with reference to the specific embodiments of the invention, the explanation is illustrative and the invention is limited only by the appended claims.

What is claimed is:

1. A vehicle safety system comprising:
   an obstacle detecting device for detecting an obstacle around a vehicle;
   a vehicle state detecting device for detecting a running state of the vehicle;
   a dangerous degree determining device electrically connected to the obstacle detecting device and the vehicle state detecting device, said dangerous degree detecting device determining a dangerous level of the vehicle by receiving information from at least one of the obstacle detecting device and the vehicle state detecting device; and
   a seat belt device provided in the vehicle and having a belt with a touching portion, and a belt controlling device electrically connected to the dangerous degree determining device, said belt controlling device changing a shape of the touching portion of the belt touching an occupant according to a dangerous level information from the dangerous degree determining device.

2. A vehicle safety system according to claim 1, wherein said vehicle state detecting device detects a speed, acceleration, rolling, sudden braking, sudden turning, side-slipping of the vehicle, and said dangerous degree determining device detects the dangerous level with respect to the obstacle and the own vehicle.

3. A vehicle safety system according to claim 1, further comprising an occupant identifying device for providing physical characteristics of the occupant sitting on a seat corresponding to the seat belt device, said belt controlling device changing the shape of the touching portion according to the physical characteristics of the occupant sitting on the seat by receiving an information from the occupant identifying device.

4. A vehicle safety system according to claim 3, wherein said belt controlling device includes a device for changing a tensile strength of the belt according to the dangerous level information from the dangerous degree determining device.

5. A vehicle safety system according to claim 4, wherein said seat belt device controls at least one of the tensile strength of the belt, and the shape of the belt including an area of the touching portion where the belt touches the occupant to notify the occupant of a dangerous degree according to a collision dangerous level information and a vehicle dangerous level information generated by the dangerous degree determining device.

6. A vehicle safety system according to claim 4, wherein said seat belt device selects a combination of the tensile strength of the belt and the shape of the belt including an area of the touching portion where the belt touches the occupant according to the physical characteristics of the occupant obtained from the occupant identifying device and information of the dangerous level generated by the dangerous degree determining device.

7. A vehicle safety system according to claim 3, wherein said occupant identifying device includes an individual identifying device for identifying the occupant sitting on each seat; a data base for storing information about the physical characteristics of individuals registered beforehand; and a reading device for reading the information about the physical characteristics of the occupant identified by the individual identifying device from the data base.

8. A vehicle safety system according to claim 3, wherein said belt includes a bag-shape portion held in a belt-shape at a normal time provided at at least a part of the touching portion where the belt touches the occupant; and said belt controlling device further includes a belt expansion-contraction device for expanding the bag-shape portion by introducing a gas thereinto and discharging the gas to restore the bag-shape portion to the belt-shape.

9. A vehicle safety system according to claim 8, wherein said belt controlling device further includes a gas pressure controlling device for controlling a pressure of the gas to be introduced into the bag-shape portion.

10. A vehicle safety system according to claim 8, wherein said bag-shape portion of the seat belt device is partitioned into at least two inner portions, said expansion-contraction device including a device for expanding or contracting the respective inner portions, and a device for controlling a flow speed and a pressure of the gas when the gas is introduced or discharged.

11. A vehicle safety system according to claim 10, wherein said gas pressure controlling device includes a gas storing portion, an inner pressure of said gas storing portion being generally held higher than a predetermined value so that when the inner pressure becomes lower than the predetermined value, a gas is introduced from an exterior to increase the inner pressure and is stopped when the inner pressure becomes higher than the predetermined value.

12. A vehicle safety system according to claim 1, wherein said obstacle detecting device includes a device for detecting a distance and a relative speed between the obstacle and the vehicle, said dangerous degree determining device calculating a time until the vehicle collides with the obstacle based on an approaching state of the vehicle and determining a dangerous level according to the time.

13. A vehicle safety system according to claim 1, wherein said vehicle state detecting device has a sensor for measuring at lease one of accelerations in front-rear directions, left-right directions and upper-lower directions of the vehicle, and angular speeds around axes of the respective directions, and said dangerous degree determining device determines a normal running state including start, acceleration, turning and braking of the vehicle; an unstable state including a sudden braking, sudden turning and side-slipping of the vehicle; a dangerous state which may cause a collision, rolling and spin of the vehicle; and an accident state where an accident of the vehicle occurs.

14. A vehicle safety system according to claim 13, wherein said dangerous degree determining device has a recording portion for tracking and recording a start and completion of at least the accident state.

* * * * *